United States Patent
Imahori et al.

(12) 
(10) Patent No.: US 6,853,735 B2
(45) Date of Patent: Feb. 8, 2005

(54) RECEIVER AND PORTABLE COMMUNICATION DEVICE

(75) Inventors: Yoshio Imahori, Shizuoka (JP); Kiyoshi Urushibata, Shizuoka (JP); Isao Fushimi, Shizuoka (JP)

(73) Assignee: Star Micronics Co., Ltd., Shizuoka (JP)

( * ) Notice: Subject to any disclaimer, the term of this patent is extended or adjusted under 35 U.S.C. 154(b) by 353 days.

(21) Appl. No.: 10/109,630

(22) Filed: Apr. 1, 2002

(65) Prior Publication Data

US 2002/0142795 A1 Oct. 3, 2002

(30) Foreign Application Priority Data

Apr. 2, 2001 (JP) ................................. P. 2001-103678

(51) Int. Cl.[7] ............................................. H04R 25/00
(52) U.S. Cl. ....................... 381/418; 381/417; 381/386; 381/396
(58) Field of Search ................................. 381/396, 417, 381/418, 322, 324, 386, 409, 410; 379/433.01, 433.02, 432; 455/350, 575.1, 550.1

(56) References Cited

U.S. PATENT DOCUMENTS

| | | | | |
|---|---|---|---|---|
| 3,588,383 A | * | 6/1971 | Carlson | 381/386 |
| 5,461,672 A | * | 10/1995 | Enokido et al. | 379/433.02 |
| 6,078,677 A | * | 6/2000 | Dolleman et al. | 381/418 |

* cited by examiner

*Primary Examiner*—Huyen D. Le
(74) *Attorney, Agent, or Firm*—Sughrue Mion, PLLC

(57) ABSTRACT

An electromagnetic receiver of a balanced armature type is employed as a receiver to be mounted in a portable telephone. The balance armature receiver has lower power consumption and higher electric acoustic conversion efficiency. The balanced armature receiver provides a required output even though small in size. The receiver occupies a considerably reduced space in the portable telephone, compared with a conventional portable telephone having a conventional dynamic receiver. The longitudinal wall of the receiver is parallel to the upper edge of a liquid crystal display panel, so that the liquid crystal display panel is extended upward and considerably enlarged.

16 Claims, 16 Drawing Sheets

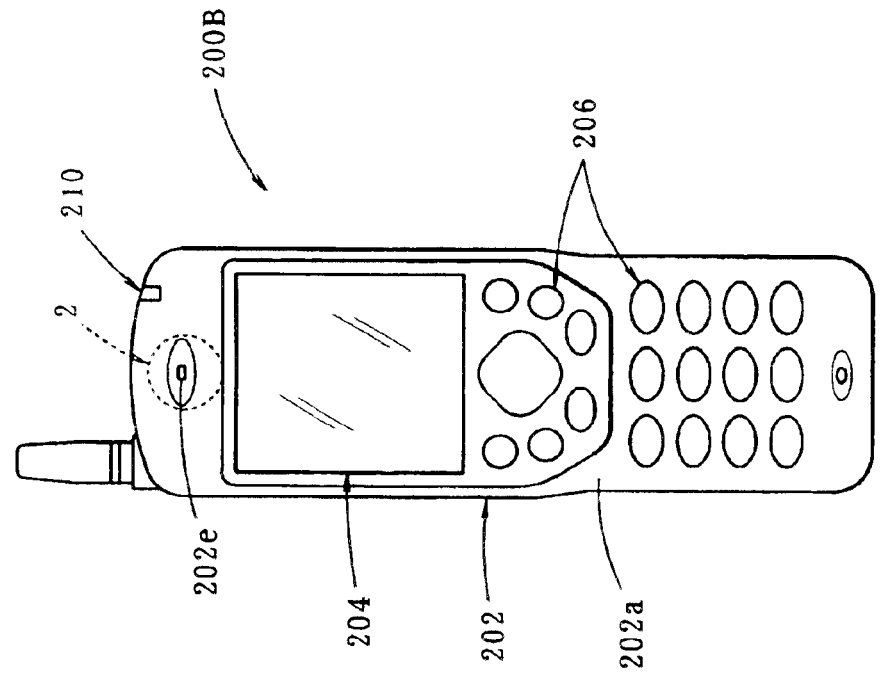
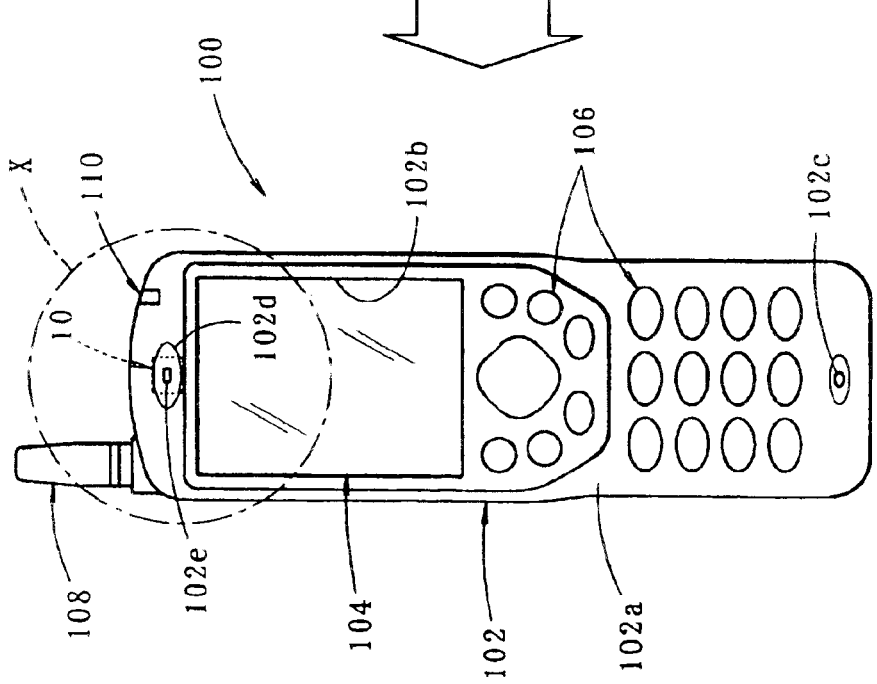
FIG. 9 (b)
FIG. 9 (a)

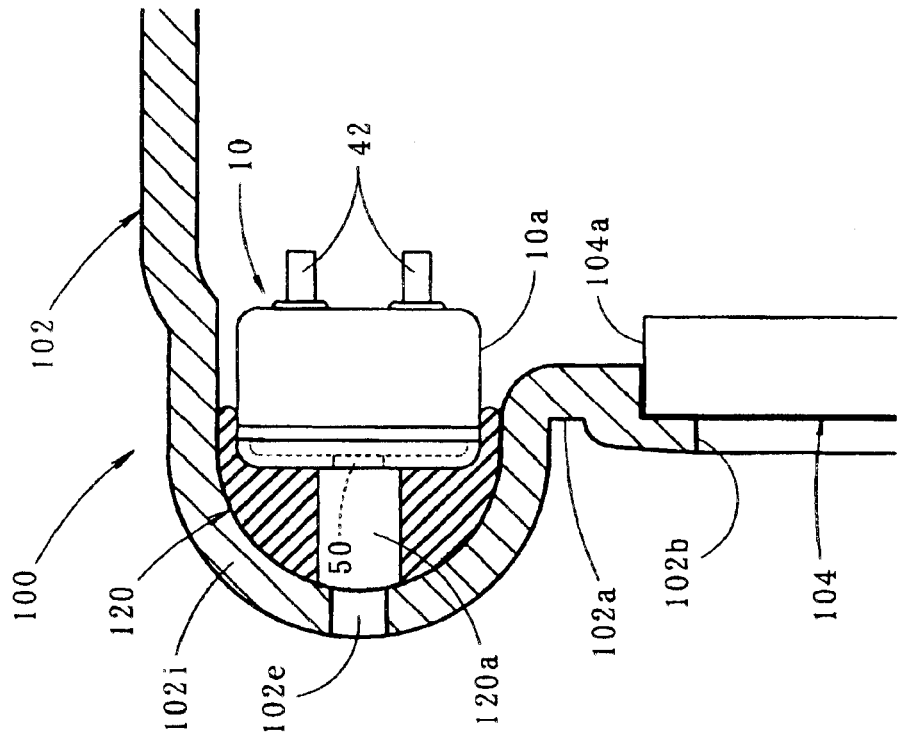
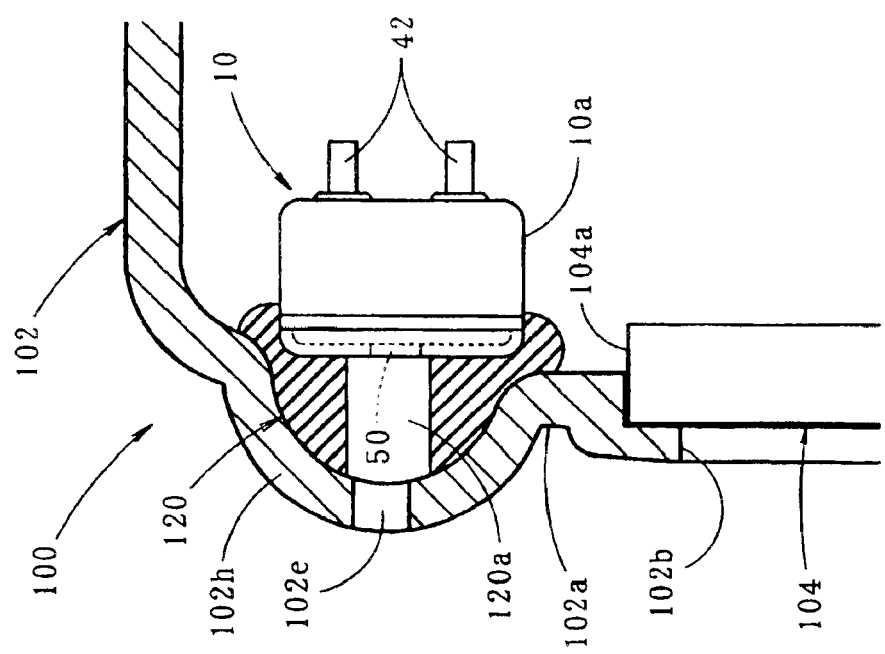

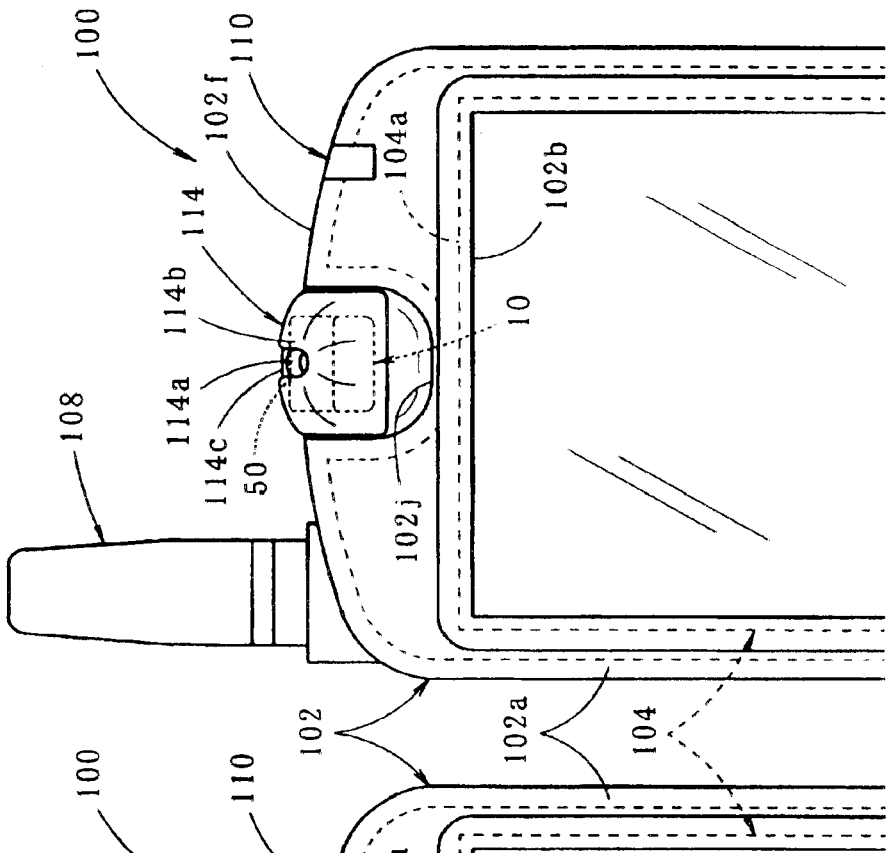
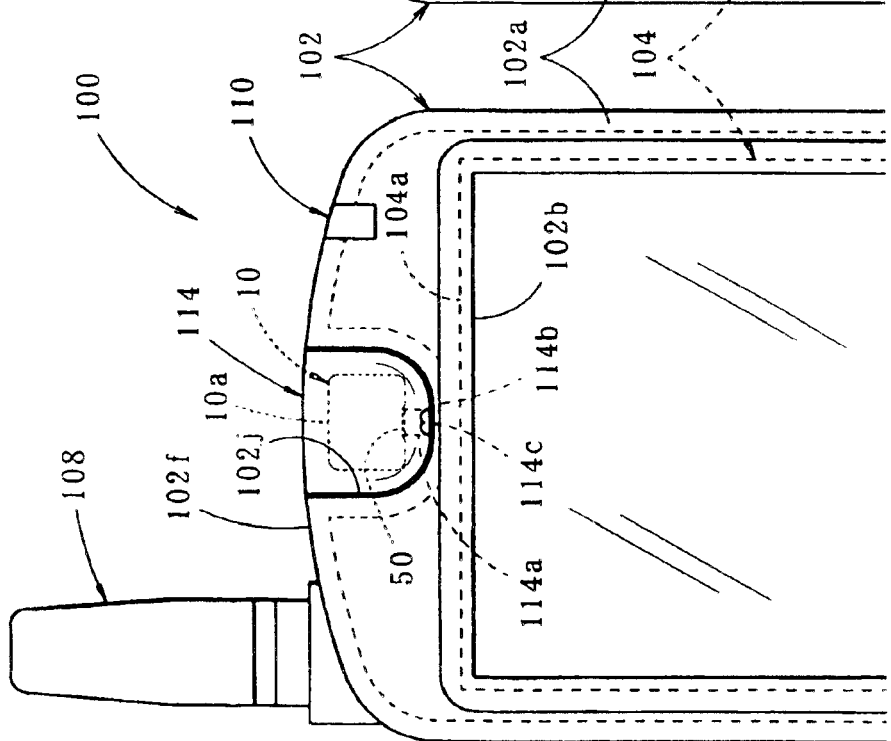
FIG. 15 (a)
FIG. 15 (b)

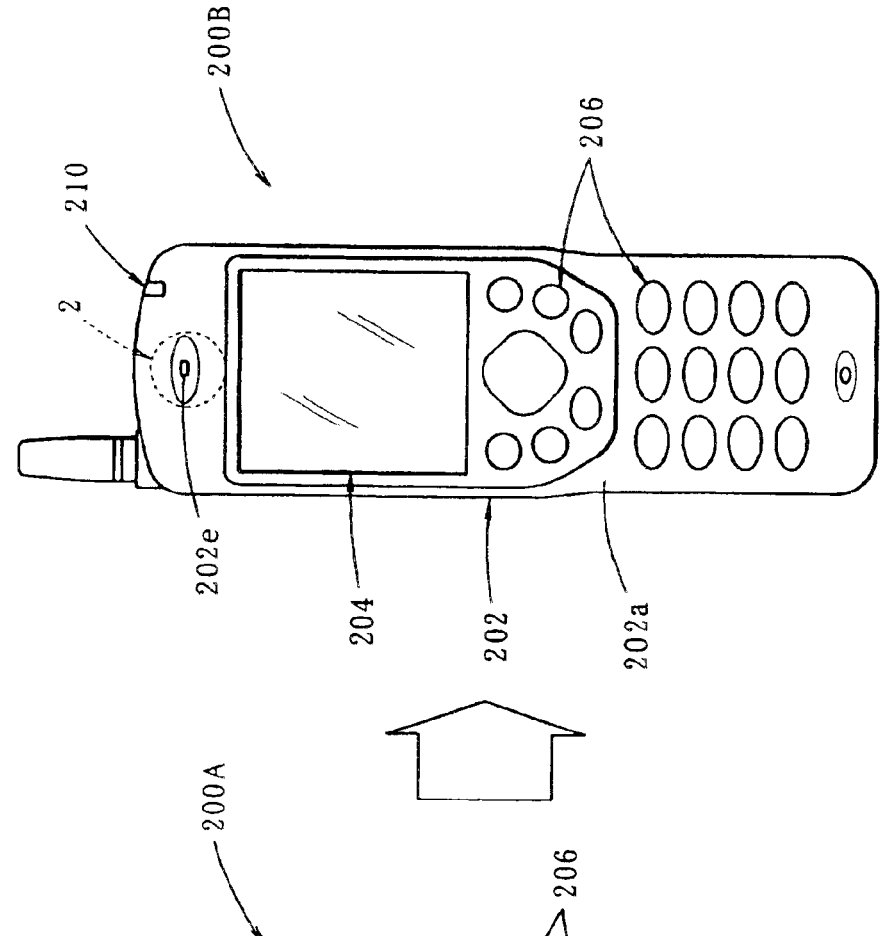
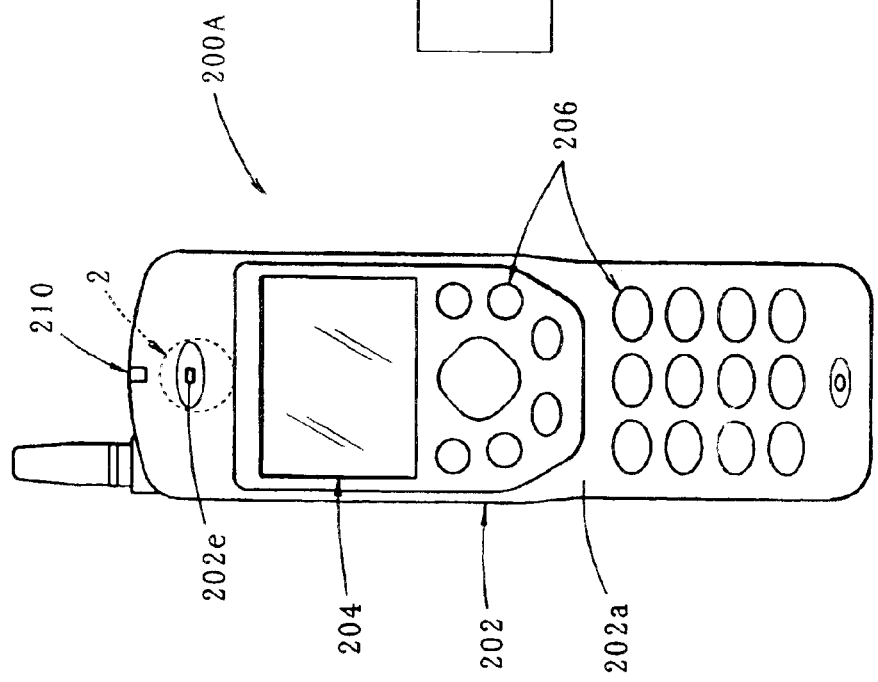

RECEIVER AND PORTABLE COMMUNICATION DEVICE

BACKGROUND OF THE INVENTION

1. Field of the Invention

The present invention relates to a receiver to be mounted in a portable communication device, and a portable communication device in which the receiver is mounted.

2. Description of Related Art

A so-called dynamic receiver has been employed as a receiver for a portable communication device, such as a handy phone.

FIG. 16A is a front view of a portable telephone 200A in which such a dynamic receiver 2 is mounted.

As shown in FIG. 16A, the portable telephone 200A has a liquid crystal display panel 204 provided in a front portion 202a of a casing 202. A small hole 202e is formed in the front portion 202a at an upward location relative to the liquid crystal display panel 204. The dynamic receiver 2 is mounted inside the casing 202 so as to be adjacent to the small hole 202e.

For a contemporary portable telephone, not only the speech function but also an information terminal communication function tends to be regarded as important. The liquid crystal display panel size need be increased as much as is possible, in order that text and graphic data can be read easily.

To satisfy this need, the size of the liquid crystal display panel is conventionally increased by altering the layout of the portable telephone components.

However, usually the outer shape of the dynamic receiver is circular, and the diameter thereof must equal or exceed a constant size (about ϕ13 mm) because a received tone quality having a specific level at the least must be obtained. Therefore, increasing the size of a liquid display panel by extending it upward is limited due to the presence of a dynamic receiver.

For example, for the portable telephone 200A in FIG. 16A, the size of the liquid crystal display panel 204 can be increased up to the size shown for the portable telephone 200B in FIG. 16B by changing arrangement of a call display LED 210 and various operation keys. However, since a space must be reserved for arrangement of the dynamic receiver 2, it is difficult to increase the size of the liquid crystal display panel 204 by extending the liquid crystal display panel further upward.

SUMMARY OF THE INVENTION

To resolve these shortcomings, it is an object of the present invention to provide a receiver, for a portable communication device, wherein a liquid crystal display panel can be considerably enlarged, when compared with a conventional one, and to provide a portable communication device in which the receiver is mounted.

To achieve the object, according to the invention, instead of using a conventional dynamic receiver, an electromagnetic receiver of a so-called balanced armature type is employed as a receiver that is to be mounted in a portable communication device, so as to, in this way, reduce the size of the receiver.

Specifically, according to the present invention, there is provided a receiver to be mounted in a portable communication device comprising:

a housing;

a diaphragm having a circumferential edge supported by the housing;

a magnetic member disposed in the housing for defining a predetermined gap and for generating a direct-current magnetic field passing across the predetermined gap;

a holding member made of magnetic material for holding the magnetic member;

an armature inserted into the predetermined gap, fixed at a first predetermined position to the holding member, and coupled to the diaphragm at a second predetermined position via a drive pin; and a coil disposed so as to surround the armature, wherein the armature is distorted in response to a signal current applied to the coil, and thereby the diaphragm is vibrated.

According to the present invention, there is provided a portable communication device in which the receiver is mounted.

The type of the "portable communication device" is not limited, and any portable communication device, such as a portable telephone, a PHS telephone, a PDA or the wireless extension of a fixed telephone, may be employed.

The shape of the "holding member" is not especially limited so long as a magnetic material is used for the member.

So long as the "armature" is inserted into the predetermined gap and is distorted by the input of a signal current to the coil, the shape of the armature as well as the "first predetermined position" and "second predetermined position" of the armature are not especially limited.

As is described for the configuration, according to the invention, since an electromagnetic receiver of a balanced armature type is employed as a receiver for a portable communication device, the following effects can be obtained.

A balanced armature of an electromagnetic receiver provides lower power consumption and higher electric acoustic conversion efficiency, and a required output can be obtained when even a small electromagnetic receiver is used. However, since the structure is comparatively complicated and manufacturing costs are higher, the balanced armature receiver is conventionally employed only for a specific application, such as a hearing aid.

According to the present invention, in order to respond to the need for an increase in the size of the liquid crystal display panel for a portable communication device, it is proposed that the balanced armature electromagnetic receiver be mounted in a portable communication device. With this configuration, the space that a receiver occupies in a portable communication device can be reduced so it is considerably less than that required by a conventional dynamic receiver.

Further, the acoustic characteristic of the dynamic receiver is deteriorated if the backspace of the diaphragm is not sufficient. Therefore, the receiver occupies a considerable space in the casing to achieve quality. However, with a balanced armature electromagnetic receiver, even if the back space of the diaphragm is highly restricted no problems are encountered when the armature is distorted. Thus, no deterioration of the acoustic characteristic occurs, and therefore, in the casing of a portable communication device, only a space substantially as large as the size of the receiver is required, so that the space occupied by the receiver is quite small.

According to the present invention, since a satisfactorily reduced, small space is occupied by the receiver in the portable communication device, when compared with a conventional one, the liquid crystal display panel of the portable communication device can be enlarged considerably. Further, if all the extra space obtained by the downsizing of the receiver need not be used for the enlargement of the liquid crystal display panel, the size of the portable communication device can be reduced accordingly.

With this configuration, the space in the housing on the back side of the diaphragm, i.e., the space on the side whereat the armature is provided, may be defined either as a space opened to the exterior or as a closed space. However, when it is defined as a closed space, the leakage of all sound from the receiver to the outside can be prevented.

Furthermore, for this configuration the external shape of the housing is not especially limited. However, for a balanced armature electromagnetic receiver, the armature is inserted into a predetermined gap defined by the magnetic member and the coil is arranged so as to enclose the armature. Thus, when the external shape of the housing is a rectangular parallelepiped having wall faces substantially parallel to the center axis of the armature, a more compact receiver can be produced.

Furthermore, since the balanced armature electromagnetic receiver is mounted in the portable communication device of the invention, either the size of the liquid crystal display panel can be considerably increased or the size of the portable communication device can be reduced.

In this case, no limitation is placed on the position whereat the receiver is mounted in the portable communication device. However, when the receiver is provided at a position near the small hole in the casing, higher effects can be obtained for the enlargement of the liquid crystal display panel or for the reduction in size of the portable communication device. The effects provided by the reduction in the size of the receiver can also be obtained when the balanced armature electromagnetic receiver is provided outside the casing.

In addition, when, as in a common portable communication device, the liquid crystal display panel is provided on the front face of the casing and the small hole is formed in the front face near the liquid crystal display panel, it is preferable that, in order to increase the efficiency with which the space in the casing is utilized, the balanced armature electromagnetic receiver be provided with the wall face arranged substantially parallel to the peripheral edge of the liquid crystal display panel.

In this case, since the external shape of the balanced armature electromagnetic receiver tends to be elongated in the direction in which the center axis of the armature is extended, it is preferable that, in order to further increase the efficiency with which the space in the casing is utilized, the receiver be provided with the center axis of the armature arranged almost parallel to the peripheral edge of the liquid crystal display panel.

At this time, the peripheral edge of the liquid crystal display panel can be any one of the upper, lower, right and left edges. When the peripheral edge is the upper edge, it is easy to enlarge the liquid crystal display panel by extending it upwards.

With this configuration, instead of a small hole being formed in the front face of the casing, a small hole may be formed either in the ridge or in the end face enclosing the front face. In this case, the receiver is also located near either the ridge or the end face. When this arrangement is employed, depending on the structure of the portable communication device, the circumferential portion of the small hole can be easily positioned to one's ear as an ear-contact portion.

Further, with this configuration, when part of the casing is used to form an expanded portion and a small hole is formed in the expanded portion, part or all of the expanded portion is inserted into the outer ear, so that the function of the ear-contact portion can be improved even more.

At this time, if at least part of the receiver is contained in the expanded portion, accordingly, the space within the casing is increased and can be used effectively.

BRIEF DESCRIPTION OF THE DRAWINGS

FIGS. 9A and 9B are respective front views of a portable telephone according to the embodiment of the invention and a conventional portable telephone provided for comparison.

FIGS. 14A and 14B are side, cross-sectional views of the essential portions of two modifications for the portable telephone according to the embodiment.

FIGS. 15A and 15B are front views of the respective essential portions in the stored state and in the projected state for the two modifications of the portable telephone of the embodiment.

FIGS. 16A and 16B are front views of two conventional portable telephones.

DETAILED DESCRIPTION OF THE PRESENT INVENTION

The preferred embodiment of the invention will now be described in detail with reference to the accompanying drawings.

Figure 1:
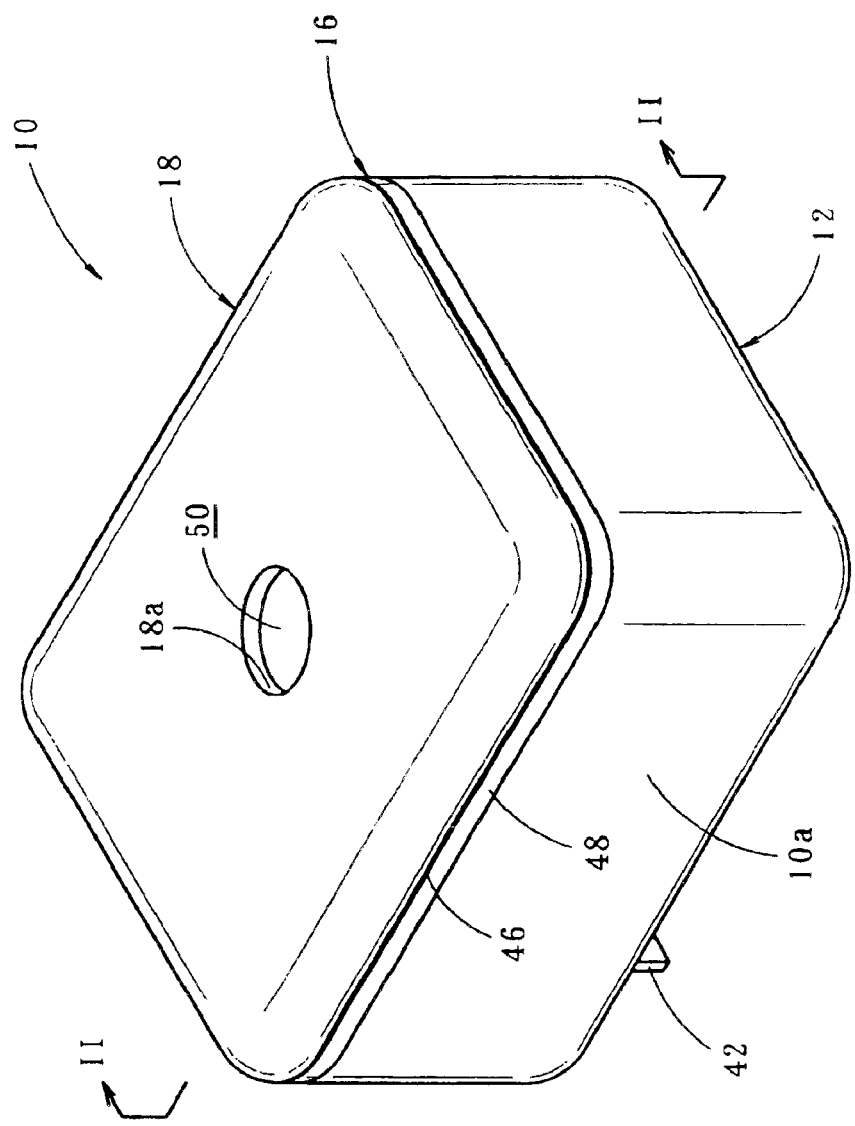
FIG. 1 is a perspective view of a receiver according to an embodiment of the present invention.
Figure 2:
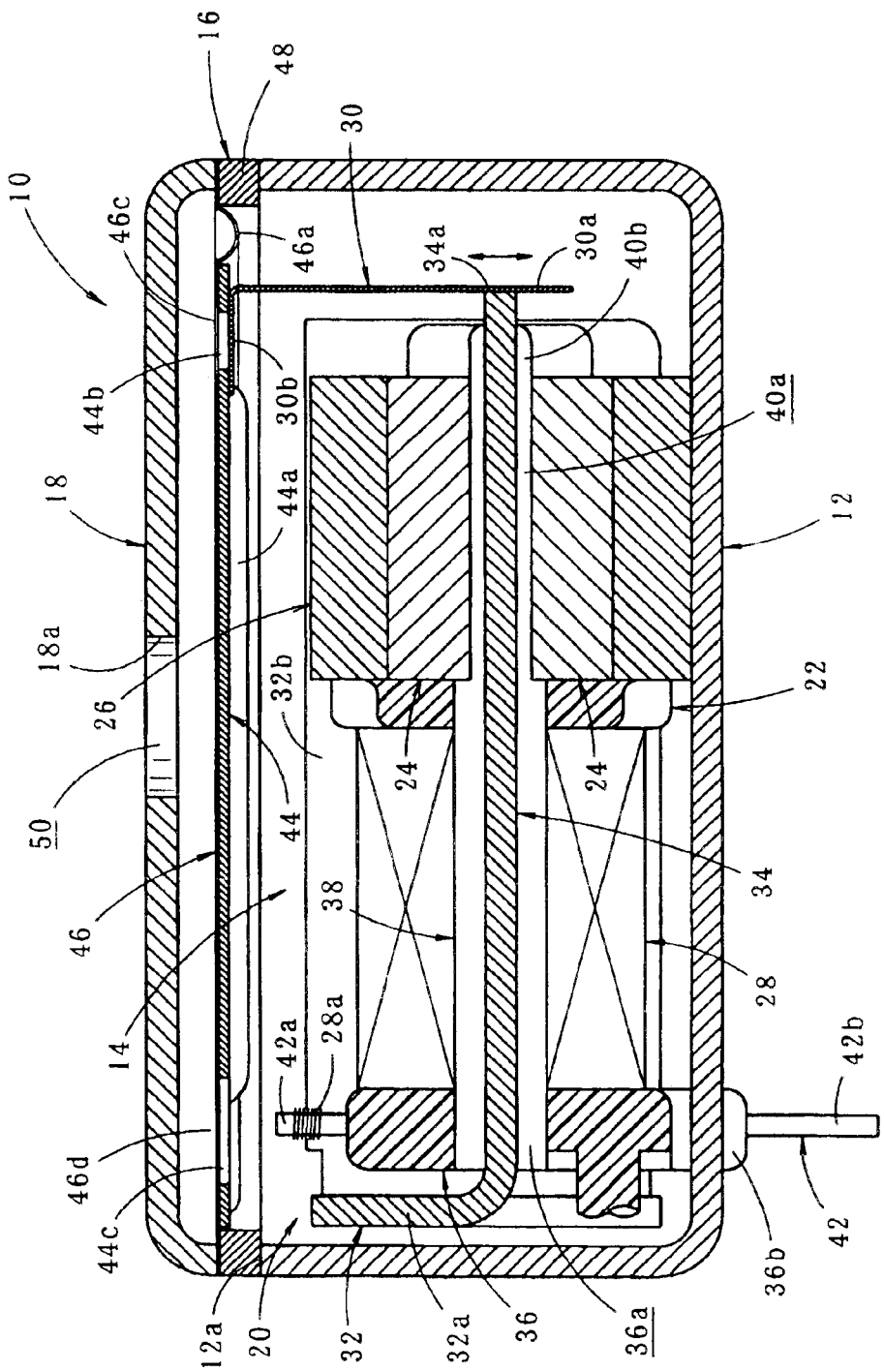
FIG. 2 is a detailed cross-sectional view taken along the line II—II in FIG. 1.
Figure 3:
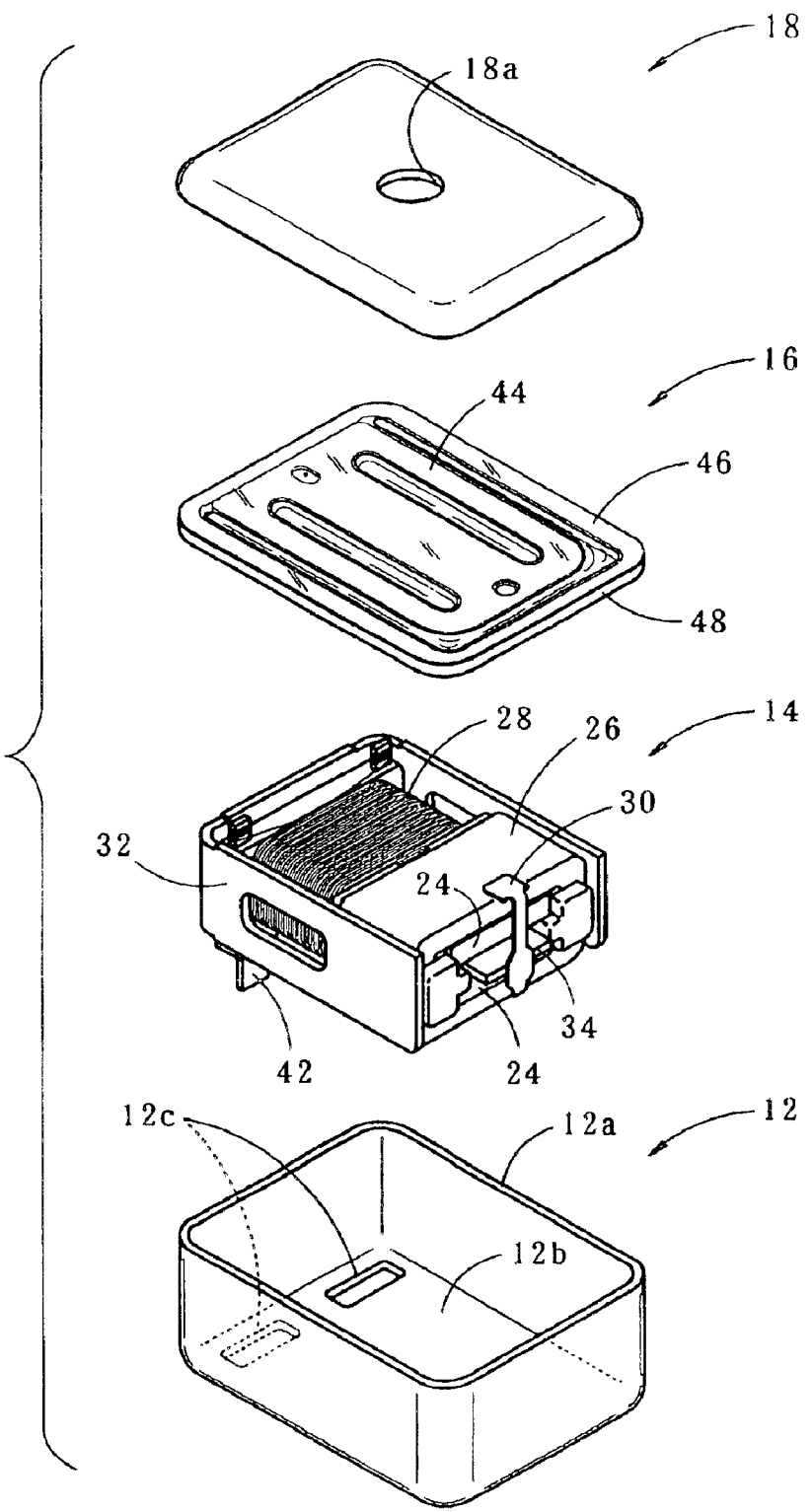
FIG. 3 is an exploded perspective view of the receiver.

FIG. 1 is a perspective view of a receiver 10 upwardly directed in accordance with an embodiment of the present invention. FIG. 2 is a detailed cross-sectional view taken along the line II—II in FIG. 1. FIG. 3 is an exploded perspective view of the receiver 10.

As is shown in FIGS. 1 to 3, the receiver 10 of this embodiment is an electromagnetic receiver of a balanced armature type having a substantially rectangular parallelepiped outer shape. The receiver 10 comprises a bottom housing 12 opened upwardly, a motor assembly 16 contained in the bottom housing 12, a diaphragm assembly 16, and a top housing 18. An upper open end 12a of the bottom housing 12 is closed by the top housing 18 via the diaphragm assembly 16.

In the explanation given for the receiver 10, the right direction in FIG. 2 is defined as a "front" and the left direction therein is defined as a "rear".

First, the arrangement of the motor assembly 14 will be described.

Figure 4:
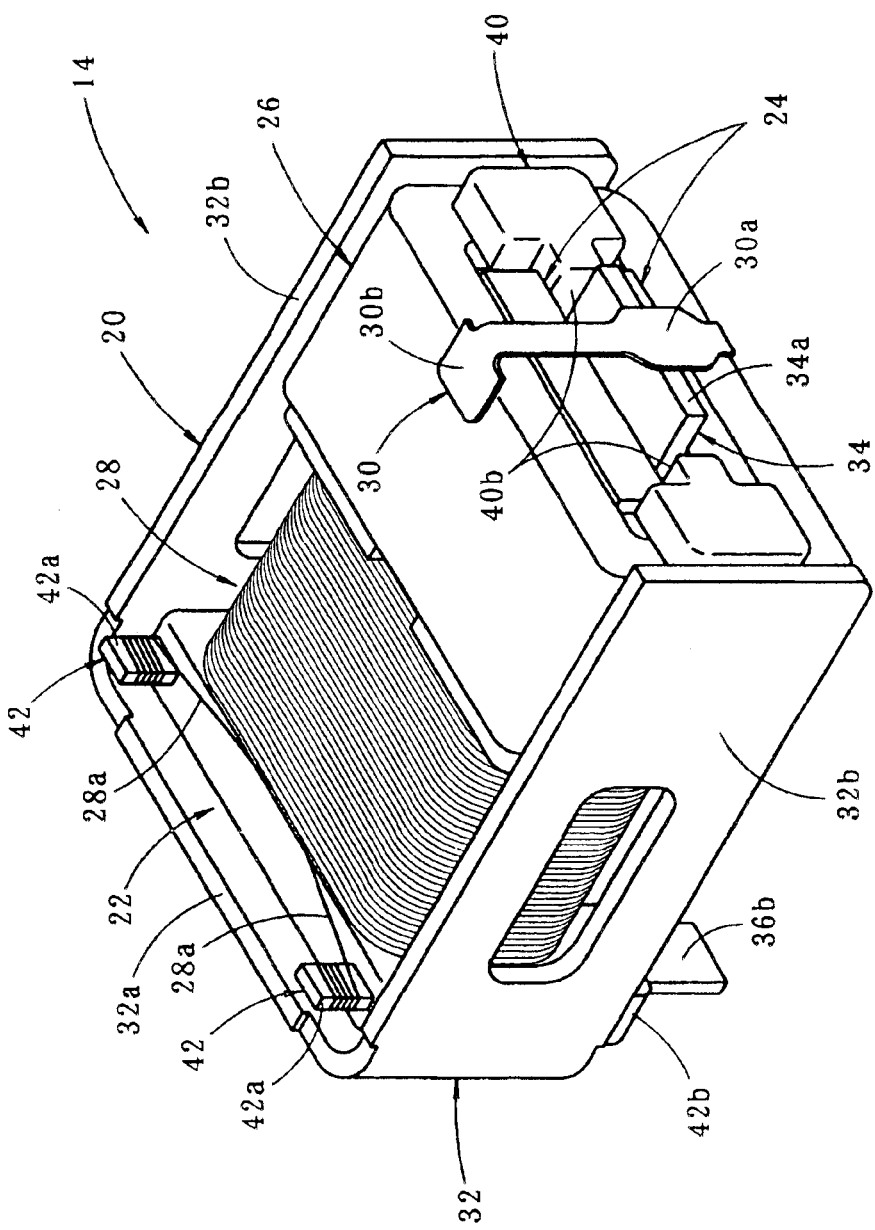
FIG. 4 is a perspective view of a motor assembly of the receiver.
Figure 5:
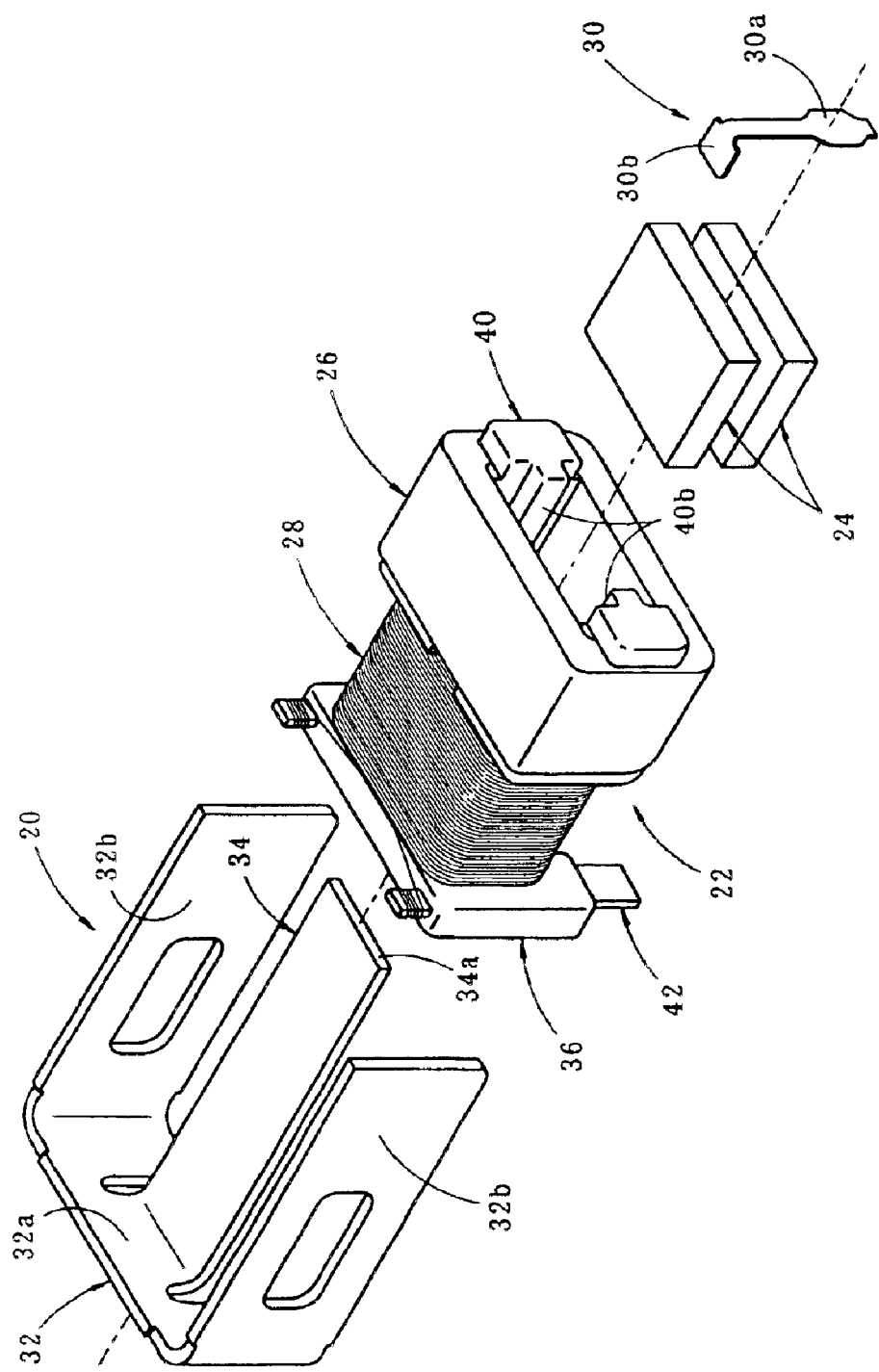
FIG. 5 is an exploded perspective view of the motor assembly.

FIG. 4 is a perspective view of the motor assembly 14, and FIG. 5 is an exploded perspective view thereof. As shown in FIGS. 4 and 5, the motor assembly 14 includes an armature frame 20, a bobbin 22, a pair of magnets (magnetic members) 24, a magnet strap (holding member of magnetic material) 26, a coil 28, and a drive pin 30.

The armature frame 20 is formed by bending a metal plate substantially in an E-shape in the plan view. The armature frame 20 includes a vertical frame 32 having a C-shape that is opened to the front in the plan view; and a cantilever armature 34 that extends forward, horizontally from the center portion of a rear wall 32a of the vertical frame 32.

Figure 6:
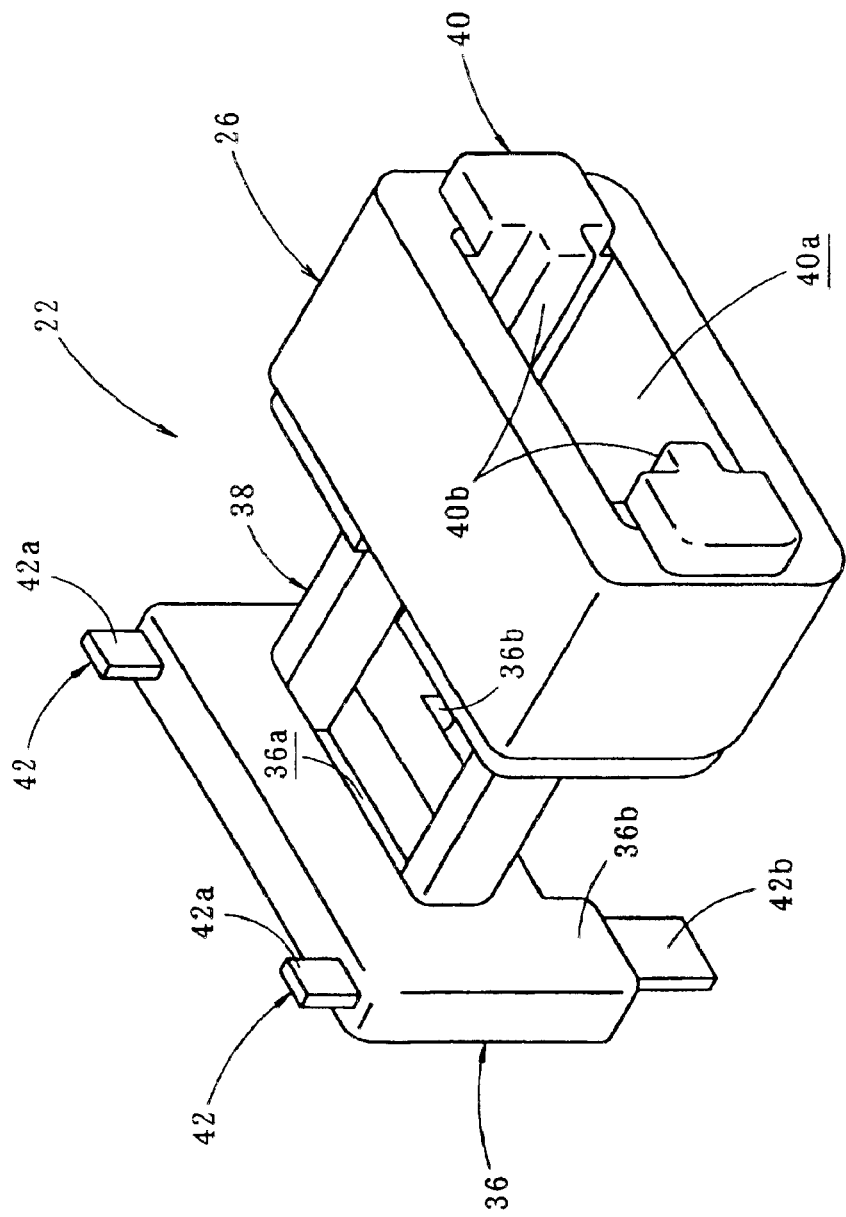
FIG. 6 is a perspective view of a bobbin of the receiver from which a coil has been removed.

As shown in a state in FIG. 6 wherein the coil 28 is removed, the bobbin 22 is so designed that a terminal holder 36, a coil core 38 and a magnet positioning portion 40 are aligned in series, and are integrally formed by injection molding. During the injection process, a pair of terminals 42, formed of metal plates, are inserted into the terminal holder 36, projecting outward from the top and bottom ends, and the magnet positioning portion 40 is inserted into and covered by the magnet strap 26.

The coil core 38 is formed of a paired of beams that are extended in the front and rear direction. The coil 28 is formed by winding a conductor around the coil core 38 a predetermined number of times. Securely wound around an upper end 42a of each terminal 42 is a coil terminal 28a of the coil 28.

Through holes 36a and 40a are respectively formed in the terminal holder 36 and the magnet positioning portion 40 that communicate with a space between the beams of the coil core 38. By employing the through holes 36a and 40a, the armature 34 is inserted into the rear of the bobbin 22 via the through hole 36a and into the through hole 40a until the armature 34 projects outward from the through hole 40a. Further, gap formation portions 40b project inward, in stepped manner, from the right and left sides of the magnet positioning portions 40 into the through hole 40a.

The magnet strap 26 is a hollow member formed of a magnetic material having a flat rectangular shape in cross section, and extending in the front and rear direction. The paired magnets 24 are retained by the inner upper and lower walls of the magnet strap 26 and the formation portions 40b of the magnet positioning portion 40. At this time, the paired magnets 24, vertically arranged and separated by the predetermined gap in the through hole 40a of the magnet positioning portion 40, produce a direct-current magnetic field passing across the gap.

While the armature 34 is so positioned as to be inserted almost in the center of the through holes 36a and 40a of the bobbin 22, the armature frame 20 is fixed to the outer side walls of the magnet strap 26 by laser welding, at side walls 32b of the vertical frame portion 32.

The drive pin 30 is an L-shaped member formed by bending a metal plate punched out in a predetermined elongated shape. While the drive pin 30 is extended vertically, a lower end 30a thereof is fixed to the distal end face 34a of the armature 34 by laser welding, and the upper end serves as a diaphragm contact portion 30b that extends horizontally to the rear above the magnet strap 26.

As is shown in FIG. 3, the bottom housing 12 is box-shaped and has a substantially rectangular upper opening 12a. A pair of rectangular holes 12c are formed in its bottom face 12b. When the motor assembly 14 is accommodated in the bottom housing 12, lower ends 42b of the terminals 42 and terminal covers 36, which project downward from the lower ends of the terminal holder 36, are fitted into and close the rectangular holes 12c. Once the motor assembly 14 is accommodated in the bottom housing 12, laser welding is employed to fix the motor assembly 14, at the lower end face of the magnet strap 26, to the bottom face 12a of the bottom housing 12.

The structure of the diaphragm assembly 16 will now be described.

Figure 7:
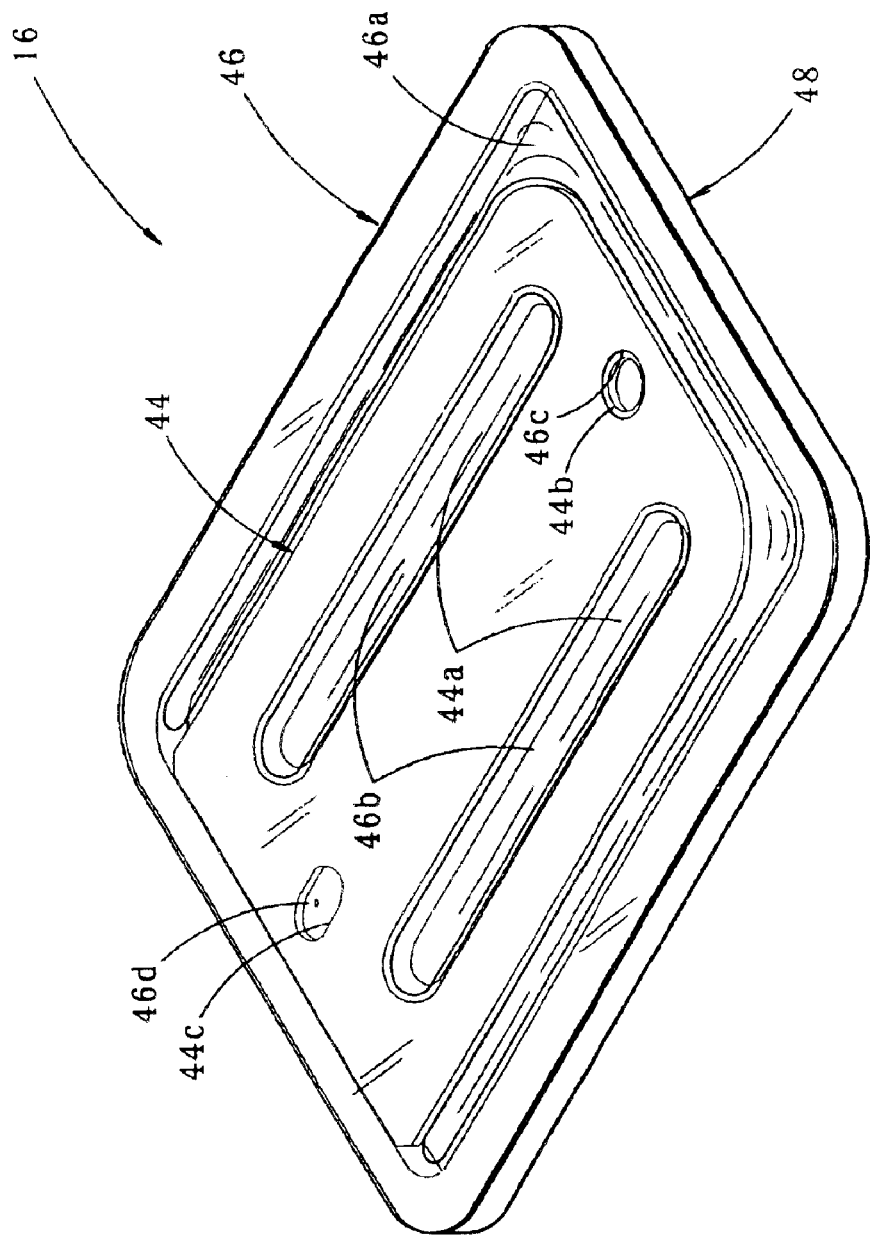
FIG. 7 is a perspective view of a diaphragm assembly of the receiver.
Figure 8:
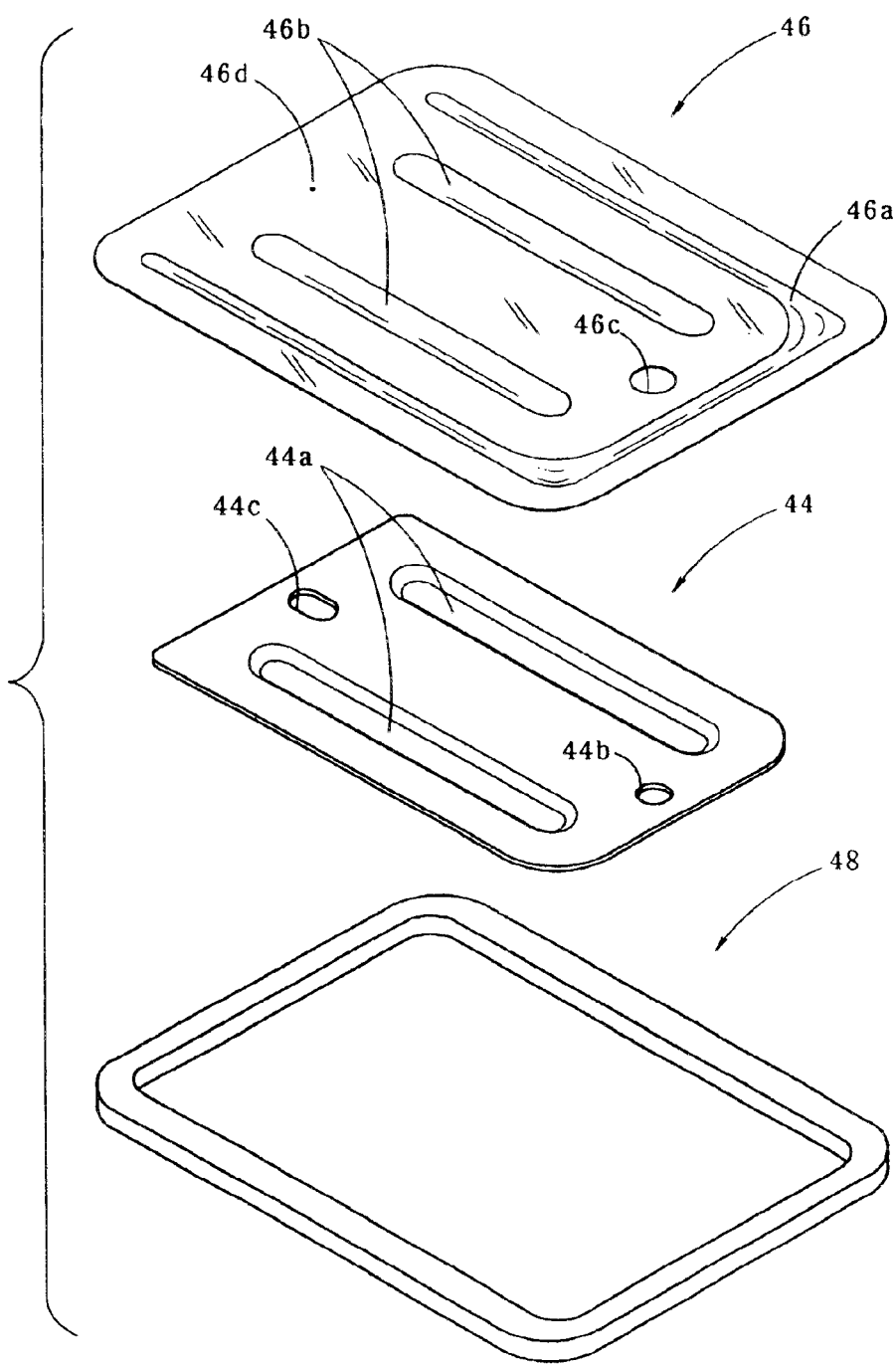
FIG. 8 is an exploded perspective view of the diaphragm assembly.

FIG. 7 is a perspective view of the diaphragm assembly 16, and FIG. 8 is an exploded perspective view thereof.

As shown in FIGS. 7 and 8, the diaphragm assembly 16 includes a metal diaphragm 44, a resin film 46 made of PET and a metal diaphragm frame 48. After the diaphragm 44 is arranged within the diaphragm frame 48 and the upper faces of these members 44 and 48 have been coated with an adhesive, the resin film 46 is thermally attached from the above.

The diaphragm frame 48 has an almost rectangular shape, and the outer shape of the diaphragm frame 48 corresponds to that of the outer periphery of the upper opening 12a of the bottom housing 12. The inner shape of the diaphragm frame 48 is slightly smaller than the inner periphery of the upper opening 21a of the bottom housing 12.

The diaphragm 44 is located at the center of the diaphragm frame 48 in the right and left direction and near the rear end of the diaphragm frame 48 with a small gap formed between the diaphragm 44 and the diaphragm frame 48. A pair of, longitudinally extended recessed beads 44a are formed in the diaphragm 44, and a circular hole 44b is formed at a position in the vicinity of the front end in the center portion while an elongated hole 44c that is longitudinally extended is formed in the vicinity of the rear end. The circular hole 44b and the elongated hole 44c are used to position the diaphragm 44 in the diaphragm frame 48.

The outer shape of the resin film 46 is to correspond to the outer periphery of the diaphragm frame 48. A recessed portion 46a having a C-shape is formed in accordance with the gap formed between the diaphragm frame 48 and the diaphragm 44. A pair of recessed portions 46b are longitudinally formed in accordance with the recessed beads 44a of the diaphragm 44. Further, a circular hole 46c is formed in the resin film 46 that is slightly larger than the circular hole 44b at a position corresponding to the circular hole 44b in the diaphragm 44. A vent hole 46d having an approximate diameter of 30 $\mu$m is formed at a position corresponding to the elongated hole 44c in the diaphragm 44.

As shown in FIG. 2, while the diaphragm assembly 16 is mounted onto the upper opening 12a of the bottom housing 12, the diaphragm assembly 14 is fixed by laser welding to the bottom housing 12 at the diaphragm frame 48. Thus, the space inside the bottom housing 12 is defined as a closed space. However, since the vent hole 46d is formed in the resin film 46, this provides an additional function that allows for adjustment of the internal air pressure.

When the diaphragm 16 is fitted in the upper opening 12a of the bottom housing 12, the diaphragm contact portion 30b of the drive pin 30 of the motor assembly 14 is brought into contact with the lower face of the diaphragm 44 wherein the circular hole 44b is formed. The adhesive is applied to the diaphragm contact portion 30b through the circular hole 46c in the resin film 46 and the circular hole 44b in the diaphragm 44, thereby the drive pin 30 and the diaphragm 44 are bonded together.

Thereafter, the top housing 18 is mounted on the diaphragm assembly 16, and laser welding is made to fix the diaphragm frame 48 to the top housing 18 and to complete the receiver 10. At this time, the housing of the receiver 10 is formed by the bottom housing 12 and the top housing 18, which are bonded together via the diaphragm frame 48.

The top housing 18 is a thin lid wherein, in the center of the upper face, a circular hole 18a is formed that serves as a sound release hole 50 for the receiver 10. Instead of this arrangement, a notch having a predetermined width may be formed in the front end of the top housing 18, and the sound release hole 50 may be formed by fixing the top housing 18 to the diaphragm frame 48.

As described above, the outer configuration of the receiver 10 of this embodiment has a rectangular parallelepiped shape. In the embodiment, the receiver 10 has a shape which is long in the front and rear direction since the armature 34 is extended in that direction, and, along which the paired magnets 24 and the coil 28 are arranged in series. Specifically, the dimensions of the housing, excluding the terminal 42 projection, is 5.6 mm (length), 4.3 mm (width) and 2.8 mm (height).

Operation of the receiver 10 of the embodiment will now be described.

In this receiver 10, a direct-current magnetic field is produced at the predetermined gap between the paired magnets 24 and constantly maintained within the gap by the magnets 24. When a signal current is supplied to the coil 28 via the terminal 42, an alternating-current magnetic field is produced in a magnetic circuit including the armature 34 that penetrates the coil 28, the vertical frame portion 32, the magnet strap 26 and the magnets 24. Since the alternating-current magnetic field is superimposed on the direct-current magnetic field, a vertical force consonant with the signal current is exerted on the armature 34 and flexes the armature 34. Accordingly, the drive pin 30 fixed to the distal end 34a of the armature 34 is vertically displaced, as indicated by an arrow in FIG. 2. The displacement is transmitted to the diaphragm 44, causing the diaphragm to vibrate. As a result, a sound wave corresponding to the signal current is generated, and released through the sound release hole 50 to the outside of the receiver 10.

Since an adequately powerful force is produced by the magnetic field and is exerted against the armature 34, the armature 34 can be flexed without difficulty by supplying a signal current to the coil 28, even though the space at the rear of the diaphragm 44 is tightly sealed. As a result, a satisfactory acoustic characteristic is obtained.

A portable telephone (portable communication device) 100 according to the embodiment will now be described.

FIG. 9A is a front view of the portable telephone 100.

As is shown in FIG. 9A, the balanced armature type electromagnetic receiver 10 is mounted within the portable telephone 100.

FIG. 9B is a front view of a portable telephone 200B that includes a dynamic receiver 2 and that is provided for comparison with the portable telephone 100 in this embodiment. For the portable telephone 200B shown in FIG. 16B, which is used for the explanation of the conventional example, the size of the liquid crystal display panel 204 has been increased to the maximum by altering the arrangement of the call display LED 210 and the various operation keys 206.

Figure 10:
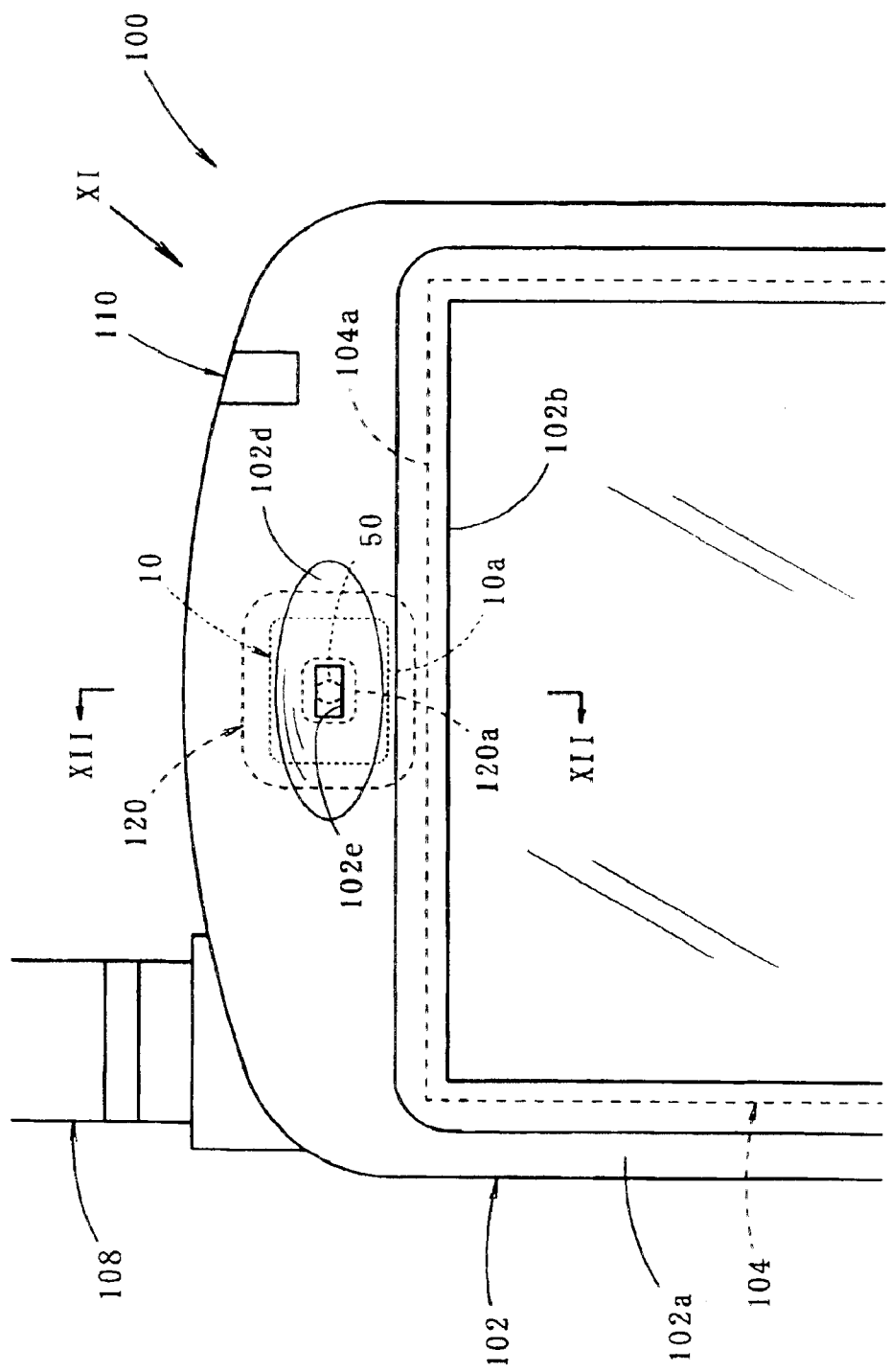
FIG. 10 is a detailed diagram showing a portion X in FIG. 9A.
Figure 11:
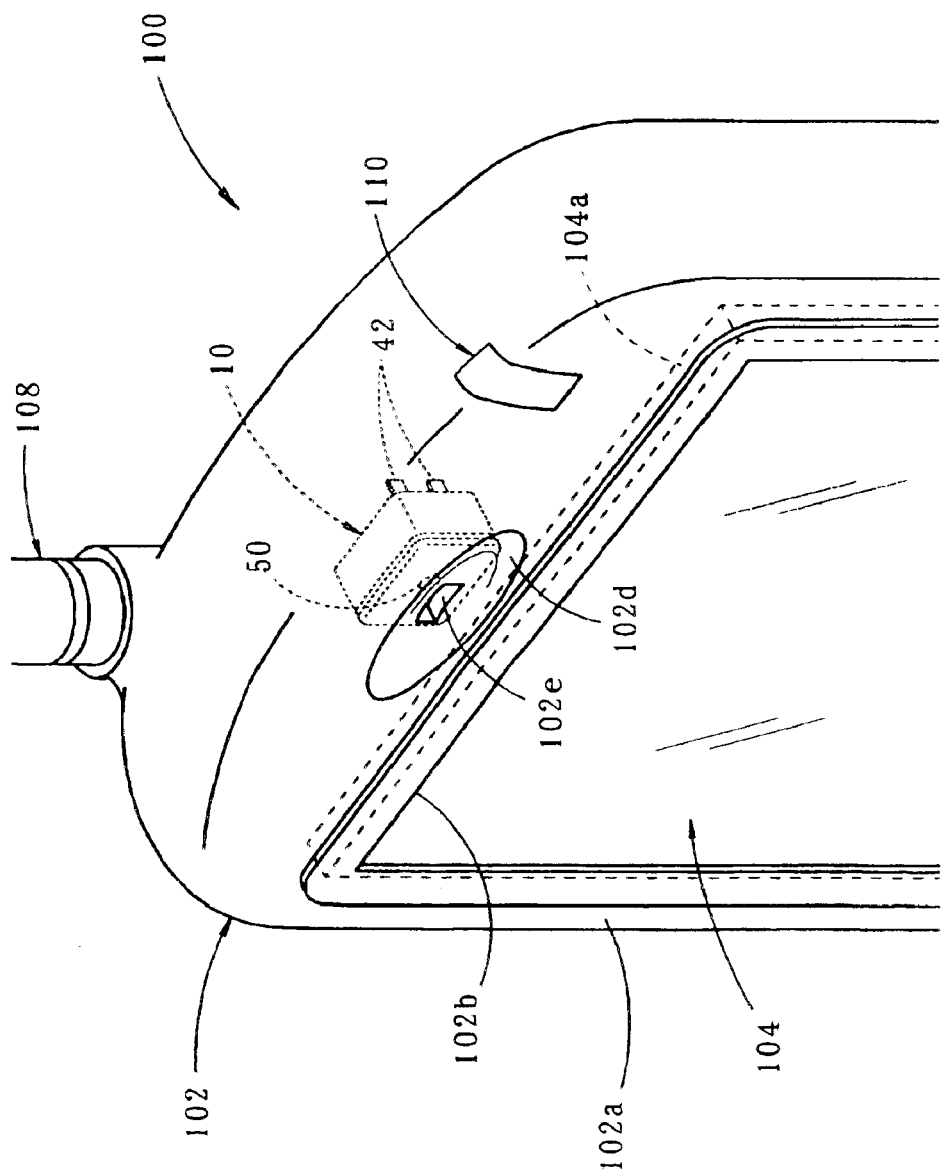
FIG. 11 is a diagram showing a view taken in the direction indicated by an arrow XI in FIG. 10.
Figure 12:
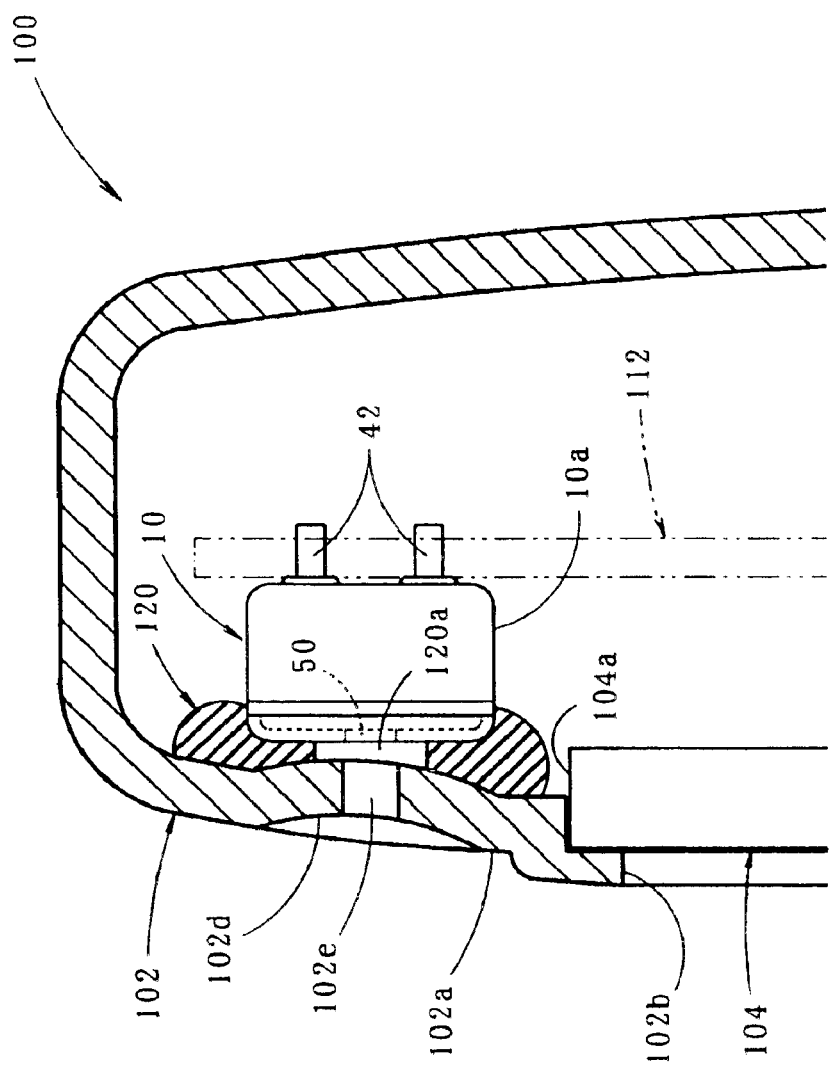
FIG. 12 is a cross-sectional view taken along line XII—XII in FIG. 10.

FIG. 10 is a detailed diagram showing the portion X in FIG. 9A. FIG. 11 is a diagram showing the portion X viewed in the direction indicated by an arrow XI in FIG. 10. And FIG. 12 is a cross-sectional view taken along the line XII—XII in FIG. 10.

As shown in FIGS. 9 through 12, for the portable telephone 100 of this embodiment, a liquid crystal panel 104 having a vertical rectangular shape is provided in the upper half of the front face 102a of the casing 103, and operation keys 106 are provided in the lower half. An antenna 108 is provided at the left upper corner of the casing 102, and a call display LED 110 is provided at a position near the right upper corner of the casing 102.

A vertical rectangular liquid crystal display window 102b is formed in the front face 102a of the casing 102 so as to cover the peripheral edge of the liquid crystal display panel 104. A microphone hole 102c is formed at a position near the lower end of the front face 102a. Further, a shallow recessed portion 102d having an elliptical shape is formed in the horizontal center of the front face 102a, just above the liquid crystal display panel 104. Formed substantially in the center of the recessed portion 102d is a small hole 102e that penetrates the casing 102.

The receiver 10 is located within the casing 102, near the recessed portion 102d in the center and just above the liquid crystal panel 104. The terminal 42 of the receiver 10 is mounted on a substrate 112. In this arrangement, a left longitudinal wall 10a (a wall parallel to the center axis of the armature 34) of the receiver 10 is arranged parallel to an upper edge 104a of the liquid crystal display panel 104, so that the sound release hole 50 is positioned just behind the small hole 102e.

A gasket ring 120 of an elastic material, such as rubber, is inserted between the receiver 10 and the front face 102a of the casing 102. The gasket ring 120 is closely attached to the casing 102 and the receiver 10 without any intervening gaps, while its center hole 120a is positioned so that it surrounds the space between the sound release hole 50 and the small hole 102e in the casing 102. With this arrangement, sound is prevented from leaking from the sound release hole 50 into the interior of the casing 102.

As shown in the drawings, since only the width of the receiver 10 (4.3 mm) is required to mount the receiver 10 in the portable telephone 100, the upper edge 104a of the liquid crystal display panel 104 is extended to be near the upper end of the casing 102.

As described in detail, according to the embodiment, since the balanced armature type electromagnetic receiver 10 is mounted in the portable telephone 100, power consumption is low and the efficiency of the electric acoustic conversion is high, so that even with a small portable telephone 100 the necessary output can be obtained. Thus, compared with the conventional dynamic receiver, the space occupied by the receiver 10 in the portable telephone 100 is considerably reduced.

Further, for a balanced armature type electromagnetic receiver, such as the receiver 10 in this embodiment, even when the back space of the diaphragm 44 is tightly sealed, the armature 34 can be flexed without any problem in response to a signal current applied to the coil 28. Thus, unlike the conventional dynamic receiver, deterioration of the acoustic characteristic does not occur. And therefore, the receiver of the present invention requires only the space that is substantially the same as the size of the receiver 10, and accordingly, the space occupied by the receiver 10 is exceedingly small.

As described above, according to this embodiment, since the space occupied by the receiver 10 in the portable telephone 100 can be reduced considerably, the size of the liquid crystal display panel 104 of the portable telephone 100 can, compared with that of a conventional display panel, be dramatically increased. Further, while in this embodiment all the space gained by reducing the size of the receiver 10 is employed to increase the size of the liquid crystal display panel 104, the space that is so gained may also be used to reduce the size of the portable telephone 100.

Moreover, for the receiver 10 of this embodiment, since the space in the bottom housing 12 is sealed, the leakage of sound from the receiver 10 to the outside can be completely prevented. And since the vent hole 44d is formed in the resin film 46, this prevents the bottom housing from being a completely closed space and provides the function that allows for the adjustment of the internal air pressure.

In addition, for the receiver 10 of the embodiment, the outer shape provided by the bottom housing 12 and the top housing 18 substantially forms a rectangular parallelepiped with the longitudinal wall 10a thereof being parallel to the center axis of the armature 34 enabling the receiver 10 to be made more compactly.

Furthermore, since the balanced armature type electromagnetic receiver 10 is mounted in the portable telephone 100 of this embodiment, the size of the liquid crystal display panel 104 can be considerably increased, compared with the conventional size.

In this case, since the receiver 10 is arranged as is shown in FIGS. 9A and 9B, near the small hole 102e in the casing 102 of the portable telephone 100, the effects provided by the enlargement of the liquid crystal display panel 104 are obvious, when compared with the portable telephone 200B wherein the conventional dynamic receiver 2 is mounted.

Moreover, the receiver 10 is formed almost as a rectangular parallelepiped extended along the center axis of the armature 34. In this embodiment, the longitudinal wall 10a that parallels the center axis of the armature 34 also parallels the upper edge 104a of the liquid crystal display panel 104, so that the liquid crystal display panel 104 can be extended further upward, and so that the space in the casing 102 can be used more efficiently.

Modifications of the embodiment will now be described.

Figure 13:
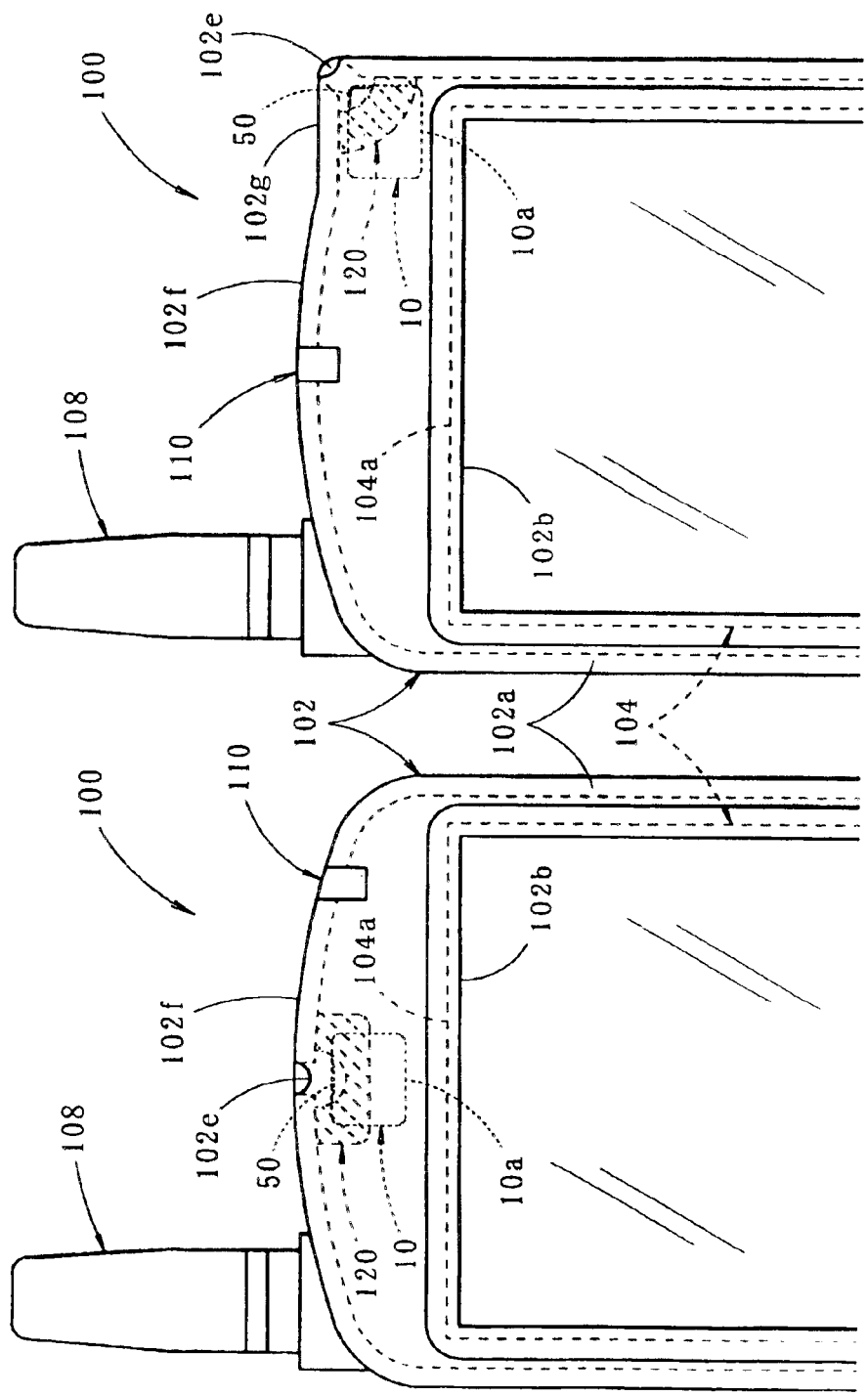
FIGS. 13A and 13B are front views of the essential portions of two modifications provided for the portable telephone according to the embodiment.

According to the embodiment, as is shown in FIG. 13A, instead of forming the small hole 102e in the front face 102a of the casing 102, the small hole 102e may be formed in a ridge 102f between the front face 102a of the casing 102 and the upper end face, and the receiver 10 may be provided near the small hole 102e.

In this case, the microphone hole 102c is positioned at an appropriate distance from the small hole 102e so that a conversation can be easily conducted. It is preferable that the sound release hole 50 of the receiver 10 be formed so it is directed upward, as shown in FIG. 13A, and that the gasket ring 120 be arranged in correlation with the positional relationship between the sound release hole 50 and the small hole 102e in the casing 102.

Further, as is shown in FIG. 13B, the right upper corner (opposite the left upper corner whereat the antenna 108 is provided) of the casing 102 may protrude slightly forming a projection 102g, the small hole 102e may be formed in the projection 102g at a position nearer the front face 102a, and the receiver 10 may be located near the small hole 102e.

In this case, since the projection 102g of the upper right corner can be inserted as an ear contact portion into the outer ear, the speech can be easily heard. Further, since the small hole 102e is located at an appropriate distance from the microphone hole 102c, a conversation can easily be conducted. It is preferable that the sound release hole 50 of the receiver 10 be formed upward as shown in FIG. 13B, and that the gasket ring 120 be provided in accordance with the positional relationship between the sound release hole 50 and the small hole 102e in the casing 102.

The small hole 102e may be also formed in the upper end face or the side wall that encloses the front face 102a, instead of in the ridge 102f on the casing 102.

As shown in FIG. 14A, when the partial portion near the upper end of the front face 102a of the casing 102 is formed as a semicircular expanded portion 102h, and when the small hole 102e is formed in the expanded portion 102h, the expanded portion 102h can be inserted into the outer edge, so that its function as the ear contact portion can be enhanced. In this case, it is preferable that the sound release hole 50 of the receiver 10 be extended forward as is shown in FIG. 14A, and that the gasket ring 120 be provided in accordance with the positional relationship between the sound release hole 50 and the small hole 102e of the casing 102.

As shown in FIG. 14B, when an expanded portion 102i is formed that is larger than the expanded portion 102b, and when part or whole the receiver 10 is accommodated in the expanded portion 102i, the space in the casing 102 can be increased, and can be effectively employed. Also in this case, it is preferable that the sound release hole 50 of the receiver 10 be extended forward as is shown in FIG. 14B, and that the gasket ring 120 also be provided in accordance with the positional relationship between the sound release hole 50 and the small hole 102e of the casing 102.

In the embodiment and the modifications, the receiver 10 has been provided in the casing 102; however, the receiver 10 can be provided outside the casing 102.

As shown in FIGS. 15A and 15B, for example, a concave 102j is formed in the ridge 102f between the front face 102a and the upper end of the casing 102, and a holder 114 wherein the receiver 10 is accommodated and a small hole 114a is formed is located in the concave 102j so as to be rotatably supported by the casing 102.

Further, the holder 114 may be moved between the storage position shown in FIG. 15A where the holder 114 is stored in the concave 102j and the projection position shown in FIG. 15B where the holder 114 projects forward from the concave 102j. When the holder 114 is located at the projection position, the holder 114 is easily inserted into the outer ear and the function of the ear contact portion can be improved even more.

In this case, when the small hole 114a is formed in the distal end 114b of the holder 114 and when a groove 114c is formed in the distal end 114b and is extended forward from the small hole 114a, sound from the receiver 10 can be exactly reached regardless that the holder 114 is stored or projected. It is preferable that the sound release hole 50 of the receiver is directed downward at the storage position.

The holder 114 may be pivoted either manually or automatically. For the automatic operation, a control mechanism can be employed that pivots the holder 114 from the storage position to the projection position when the speech key of the portable telephone 100 is pressed, and that pivots the holder 114 from the projection position to the storage position when the speech end key is pressed.

For the receiver 10 of the embodiment, the magnetic member that produces the direct-current magnetic field has been composed of the pair of magnets 24; however, other components can be employed. As an example, a single, magnet having the shape of a letter "U" can be used. Alternatively, instead of the pair of magnets, one may be a magnet while the other may be something of magnetic material such as common steel.

In the embodiment, the receiver 10 has been mounted in the portable telephone 100. However, when the receiver is mounted in another portable communication device, such as a PHS or a PDA, or in the wireless extension of a fixed telephone, the same configuration as used in the embodiment may be employed to obtain the same effects as in the embodiment.

What is claimed is:

1. A balance armature type receiver to be mounted in a portable communication device that has a display panel, comprising:

a housing;

a diaphragm having a circumferential edge supported by the housing;

a magnetic member disposed in the housing for defining a predetermined gap and for generating a direct-current magnetic field passing across the predetermined gap;

a holding member made of magnetic material for holding the magnetic member;

an armature inserted into the predetermined gap, fixed at a first predetermined position to the holding member, and coupled to the diaphragm at a second predetermined position via a drive pin;

a coil disposed so as to surround the armature;

a sound release hole on a top surface of the housing on a same side as the display panel; and a terminal to be connected to the portable communication device on an under surface that is an opposite side of the surface provided with the sound release hole, wherein the armature is distorted in response to a signal current applied to the coil, and thereby the diaphragm is vibrated, and the housing having an outer shape of a substantially rectangular parallelepiped having a wall face almost parallel to the center axis of the armature.

2. The receiver according to claim 1, wherein the back space of the diaphragm in the housing where the armature is provided is a closed space.

3. A portable communication device comprising a receiver mounted therein, the receiver comprising:

a housing;

a display panel a diaphragm having a circumferential edge supported by the housing;

a magnetic member disposed in the housing for defining a predetermined gap and for generating a direct-current magnetic field passing across the predetermined gap;

a holding member made of magnetic material for holding the magnetic member;

an armature inserted into the predetermined gap, fixed at a first predetermined position to the holding member, and coupled to the diaphragm at a second predetermined position via a drive pin;

a sound release hole on a same side as the display panel; and a coil disposed so as to surround the armature, wherein the armature is distorted in response to a signal current applied to the coil, and thereby the diaphragm is vibrated, wherein the armature extends from a rear wall of a C-shaped frame with a flat surface and a plane of the armature is perpendicular to the flat surface of the C-shaped portion.

4. The portable communication device according to claim 3, wherein the back space of the diaphragm in the housing where the armature is provided is a closed space.

5. The portable communication device according to claim 3, wherein the housing has an outer shape of a substantially rectangular parallelepiped having a wall face almost parallel to the center axis of the armature.

6. The portable communication deice according to claim 3, the portable communication device further comprising a casing having a small hole, wherein the receiver is provided at a position in the vicinity of the small hole in the casing.

7. The portable communication device according to claim 6, wherein the small hole is formed in one of a ridge and an end face that surrounds the front portion of the casing.

8. The portable communication device according to claim 6, wherein a part of the casing is formed as an expanded portion; and the small hole is formed in the expanded portion.

9. The portable communication device according to claim 8, wherein at least a part of the receiver is contained in the expanded portion.

10. The portable communication device according to claim 3, further comprising a display panel, wherein the receiver is provided so that a long side of the receiver is arranged substantially parallel to a short side of the display panel.

11. The portable communication device according to claim 10, wherein the center axis of the armature of the receiver is substantially parallel to the peripheral edge of the display panel.

12. The portable communication device according to claim 10, wherein the peripheral edge of the display panel is an upper edge of the display panel.

13. The portable communication device according to claim 10, wherein the small hole is formed in one of a ridge and an end face that surrounds the front portion of the casing.

14. The portable communication device according to claim 10, wherein a part of the casing is formed as an expanded portion; and the small hole is formed in the expanded portion.

15. The portable communication device according to claim 14, wherein at least a part of the receiver is contained in the expanded portion.

16. The portable communication device according to claim 1, wherein the armature extends from a rear wall of a C-shaped frame with a flat surface and a plane of the armature is perpendicular to the flat surface of the C-shaped portion.

* * * * *